US012643620B2

(12) United States Patent
Wear et al.

(10) Patent No.: US 12,643,620 B2
(45) Date of Patent: Jun. 2, 2026

(54) TRACK TENSION MONITORING USING ACCELERATION AND TRANSMISSION SPEED SENSOR INPUTS

(71) Applicant: Caterpillar Inc., Peoria, IL (US)

(72) Inventors: Daniel Gregory Wear, East Peoria, IL (US); Timothy Gibbs Sidles, Oswego, IL (US); Solimar Reyes-Rodriguez, Edwards, IL (US); Daniel Alejandro Montano, Peoria, IL (US); Mitchell Chase Vlaminck, Germantown Hills, IL (US); Li Zhang, Dunlap, IL (US)

(73) Assignee: Caterpillar Inc., Peoria, IL (US)

(*) Notice: Subject to any disclaimer, the term of this patent is extended or adjusted under 35 U.S.C. 154(b) by 25 days.

(21) Appl. No.: 18/936,449

(22) Filed: Nov. 4, 2024

(65) Prior Publication Data

US 2026/0125124 A1 May 7, 2026

(51) Int. Cl.
*B62D 55/30* (2006.01)
*E02F 9/26* (2006.01)
*G04F 10/00* (2006.01)

(52) U.S. Cl.
CPC .............. B62D 55/30 (2013.01); E02F 9/268 (2013.01); G04F 10/00 (2013.01)

(58) Field of Classification Search
None
See application file for complete search history.

(56) References Cited

U.S. PATENT DOCUMENTS

| | | | |
|---|---|---|---|
| 6,024,183 A | 2/2000 | Dietz et al. | |
| 10,099,735 B2 | 10/2018 | Vik | |
| 11,046,180 B2 | 6/2021 | Anderson | |
| 11,685,453 B2 | 6/2023 | West et al. | |
| 12,012,728 B2 | 6/2024 | Kim | |
| 2016/0311481 A1* | 10/2016 | Grant | B62D 55/30 |
| 2021/0101653 A1* | 4/2021 | West | B62D 55/30 |
| 2021/0362791 A1* | 11/2021 | West | B62D 55/065 |
| 2024/0246621 A1* | 7/2024 | Aubin-Marchand | B62D 55/32 |
| 2025/0304162 A1* | 10/2025 | Kohler | B62D 11/08 |

FOREIGN PATENT DOCUMENTS

| | | | | |
|---|---|---|---|---|
| CN | 111055935 A | * | 4/2020 | B62D 55/30 |
| WO | WO2024052876 A2 | | 3/2024 | |

OTHER PUBLICATIONS

English translation of CN111055935A, retrieved from Espacenet on Jan. 13, 2026 (Year: 2026).*

* cited by examiner

*Primary Examiner* — Amelia Vorce

(57) ABSTRACT

Monitoring track tension of track-enabled work machines using work machine acceleration and transmission speed sensors is provided. When a speed change of a work machine is detected, a timer is started. When an acceleration or deceleration of the work machine is detected, the timer is stopped. Elapsed time between the start of the speed change and the detection of acceleration or deceleration may indicate an amount of time required for taking up slack or sag in a work machine track. If the time required for taking up the slack or sag is excessive, an indication may be received that the track is too loose. If time required for taking up the slack or sag is minimal, an indication may be received that the track is too tight. The determination of the time required for taking up the slack or sag may indicate that tension in the track requires adjustment.

20 Claims, 7 Drawing Sheets

FIG. 3

TRACK SAG VERSUS BACKLASH TIME

400

SPEED VS. TIME ⎯ 410

ACCELERATION VS. TIME ⎯ 430

FIG. 5

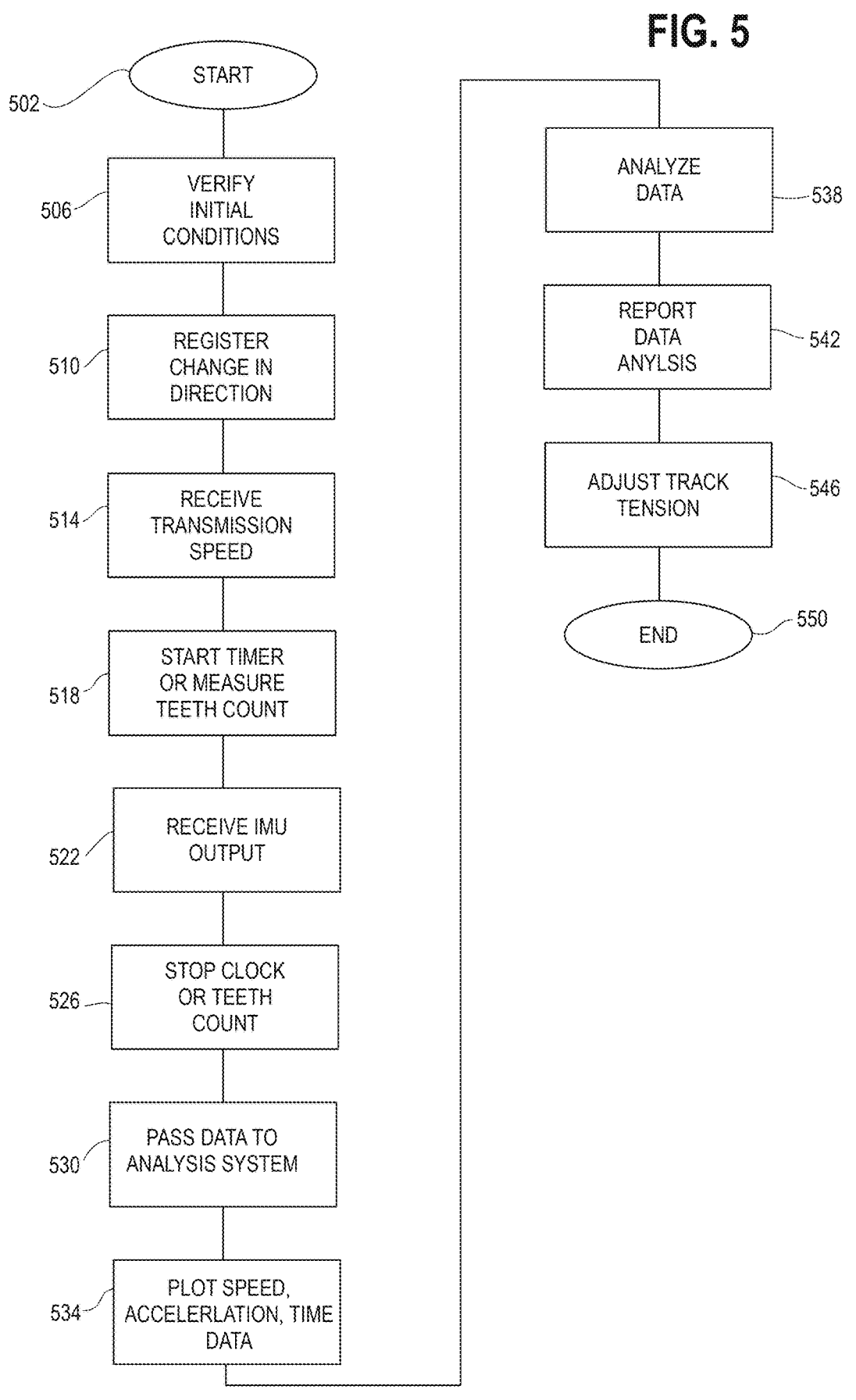

502 — START

506 — VERIFY INITIAL CONDITIONS

510 — REGISTER CHANGE IN DIRECTION

514 — RECEIVE TRANSMISSION SPEED

518 — START TIMER OR MEASURE TEETH COUNT

522 — RECEIVE IMU OUTPUT

526 — STOP CLOCK OR TEETH COUNT

530 — PASS DATA TO ANALYSIS SYSTEM

534 — PLOT SPEED, ACCELERLATION, TIME DATA

ANALYZE DATA — 538

REPORT DATA ANYLSIS — 542

ADJUST TRACK TENSION — 546

END — 550

COMPUTING DEVICE
700

SYSTEM MEMORY
704

OPERATING SYTEM
706

PROGRAM INSTRUCTIONS
708
IMU 142
TOS 144
ECM 146

PROCESSING UNIT
702

INPUT DEVICE(S)
712

REMOVABLE
STORAGE
716

COMMUNICATION
CONNECTION(S)
720

OUTPUT
DEVICES(S)
714

NON-REMOVABLE
STORAGE
718

TRACK TENSION MONITORING USING ACCELERATION AND TRANSMISSION SPEED SENSOR INPUTS

TECHNICAL FIELD

The present disclosure relates to equipment component monitoring and adjustment. More particularly, the present disclosure relates to monitoring and adjustment of work machine track tension based on acceleration and transmission speed sensor inputs.

BACKGROUND

Modern work machines such as bulldozers, front-end loaders, skid steers, tanks, cranes, material handling systems, and the like often used track systems for moving the work machines over various types of terrain in a variety of work environments. Typically, work machine track systems employ one or more sprocket or wheel assemblies that engage tracks from an underside and that move tracks and the associated work machines forward and backward.

During normal forward movement of a track type work machine, the slack or sag available in the track lays in front of the drive sprocket. During a suitably quick directional change (forward to reverse or vice versa), the track slack or sag must pass from the front of the sprocket to the rear of the sprocket. Due to the inertia of the work machine, there exists a short period of time between when the work machine controls begin slowing the transmission output and when the machine physically responds where the track slack or sag is being taken up and is moved from the front of the sprocket to the rear of the sprocket.

Undesired amounts of track slack or sag can be harmful to work machine components. If the track has too much slack or sag, the track can come of the associated track system leaving the work machine in an immobile condition. If the track does not have enough slack or sag where the track is too tight, the track can damage components of the track system. For example, the track may bend, break, or otherwise damage sprocket teeth, or the track may overly stress drive components causing excessive wear and tear.

An example method and system for monitoring track tension in construction machinery is described in U.S. Pat. No. 12,012,728 B2 to Kim et al. titled "Method and System for Monitoring Track Tension in Construction Machinery" (hereafter "the '728 document"). The methods and systems of the '728 document describe use of track deflection values and track spring pressure values for determining a track tension state that may be used by a machine learning algorithm for determining track tension state and for predicting a lifespan of track-related components. Use of a machine learning algorithm for determining track tension state is computationally expensive and requires substantial training of the machine learning algorithm for a vast number of different track systems in use with different machines having different track system components and operating characteristics.

Examples of the present disclosure are directed to overcoming the deficiencies described above.

SUMMARY OF THE INVENTION

Methods are provided for monitoring track tension of track-enabled work machines using work machine acceleration and transmission speed sensors. According to examples, a speed change of a transmission output system of a track-enabled work machine is detected, and a timer is started. Detecting a speed change of the work machine may include receiving a detection of a direction change of the work machine. Detecting a speed change also may be based on a change of a transmission output associated with movement of the work machine track and may include receiving a detection of a speed change based on a transmission output associated with rotation of a sprocket that is operative to move the work machine track.

When acceleration or deceleration of the work machine is detected by an inertial measurement unit, the timer is stopped. Based on a time delay between the speed change of the work machine and the indication of acceleration or deceleration, a determination is made as to whether tension of one or more tracks of the track-enabled work machine is/are too tight or too loose. Determining the time delay may include determining a time for a take-up of the sag in the work machine track. Based on the determination, the one or more tracks may be adjusted to set the tension to an acceptable level. Adjustment of the one or more tracks may be performed automatically by an electronic control module.

According to another example, a system is provided. The system may include a transmission output unit operative to indicate a speed change of the work machine. An inertial measurement unit is operative to indicate an acceleration or deceleration of the work machine. According to examples, the system includes an electronic control module (ECM). The electronic control module is operative to start a timer when an indication of a speed change of a work machine is detected. The ECM also is operative to stop the timer when an indication of an acceleration or deceleration of the work machine is detected. After stopping the timer, the ECM is operative to determine a time delay between the indication of the speed change of the work machine and the indication of the acceleration or deceleration of the work machine. Based at least in part on the determined time delay, the ECM is operative to determine an amount of sag in a work machine track. According to an example, the ECM is further operative to provide an indication that the tension of the work machine track requires adjustment if the determined amount of sag in the work machine track is above or below an acceptable amount of sag.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 illustrates a histogram graph showing track backlash time versus average track sag, according to examples of the present disclosure.

FIG. 5 illustrates a flow diagram of an example method for monitoring track tension of one or more tracks of a track-enabled work machine, according to examples of the present disclosure.

DETAILED DESCRIPTION

Wherever possible, the same reference numbers will be used throughout the figures to refer to the same or like parts. In the figures, the left-most digit(s) of a reference number identifies the figure in which the reference number first appears.

Figure 1:
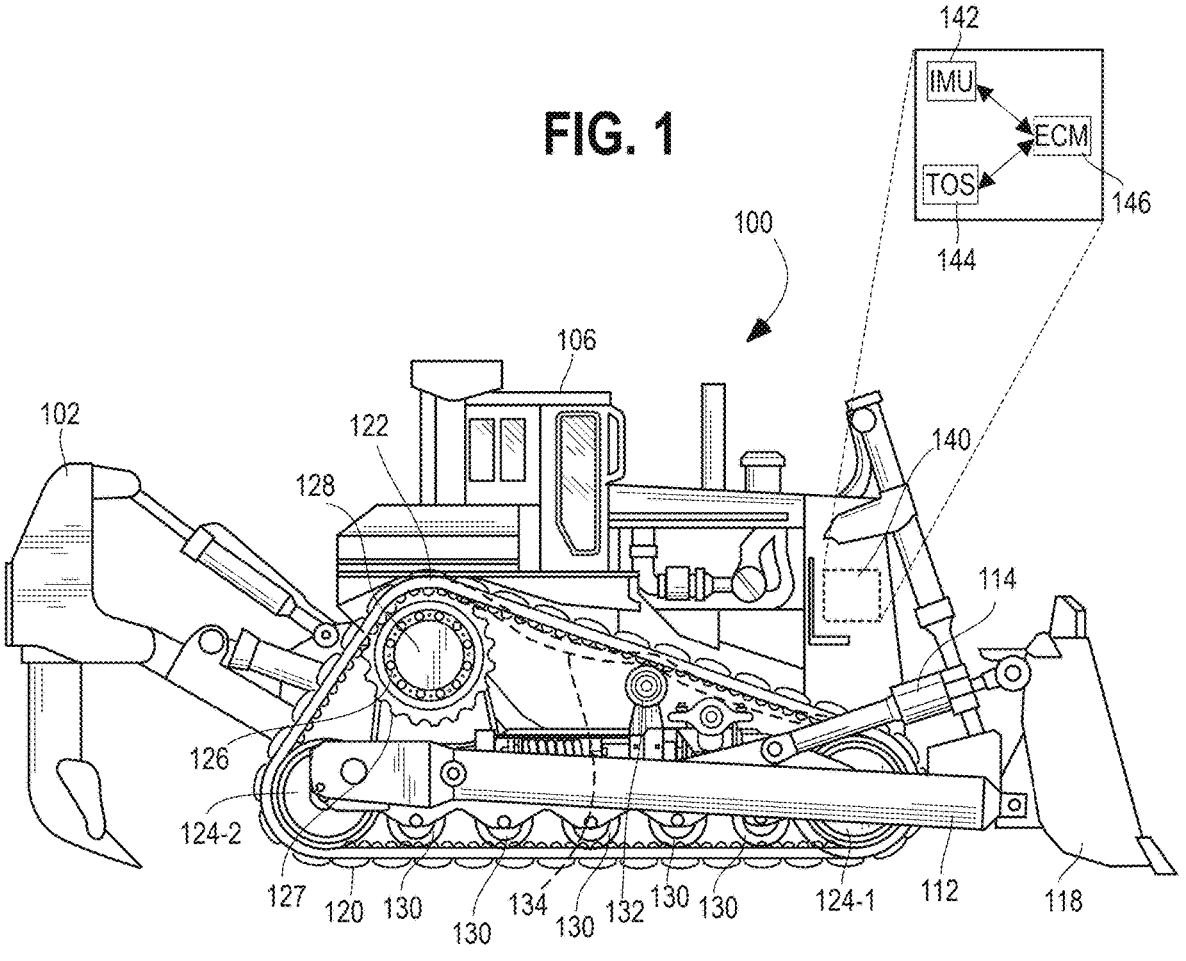
FIG. 1 illustrates a left-side elevation view of a work machine having a track system for movement of the work machine, according to examples of the present disclosure.

FIG. 1 illustrates a left-side elevation view of a work machine having a track system for movement of the work machine, according to examples of the present disclosure. According to examples, systems and methods are provided for monitoring track tension of track-enabled work machines using work machine acceleration and transmission speed sensors. A speed change of a transmission output system of a track-enabled work machine is detected, and a timer is started. When acceleration or deceleration of the work machine is detected by an inertial measurement unit, the timer is stopped. Based on a time delay between the speed change of the work machine and the indication of acceleration or deceleration, a determination is made as to whether tension of one or more tracks of the track-enabled work machine is/are too tight or too loose. Based on the determination, the one or more tracks may be adjusted to set the tension to an acceptable level.

As illustrated in FIG. 1, a work machine 100 is provided with which various types of work, for example, earthmoving, material moving, and the like may be performed. The work machine 100 illustrates a typical bulldozer type machine with which material such as dirt, rock, concrete, wood, steel, and the like may be moved from one location to another or may be loaded onto or unloaded from a transport, such as a truck or trailer. The work machine 100, illustrated in FIG. 1, is for purposes of example only and is not limiting of other types of work machines that may be utilized according to examples of the present disclosure. For example, the work machine 100 may include a bulldozer, tractor, large-scale earthmoving machine, and the like. In addition, as will be appreciated, examples of the present disclosure may be utilized with other types of vehicles, including but not limited to automobiles, trucks, trailers, as well as any type of track-enabled machine, and the like.

Referring still to FIG. 1, the work machine 100 includes a cab 106 in which an operator controls the work machine 100. The engine compartment 104 includes space for a combustion engine, hybrid combustion/electric engine/motor combination, or an electric motor system for a fully electric work machine 100. In addition, the engine compartment 104 may house other systems and components such as transmissions, cabin cooling systems, and the like. As will be described below, the engine compartment 104 also may include various control systems available for operation of the work machine 100.

Forward of the cab and engine compartment are illustrated components required for movement and use of a work tool attached to the work machine 100. According to examples, the push arms 112 may articulate relative to push arm mounts to raise or lower an attached work tool as required for picking up, dropping and/or pushing material. According to examples, the push arms 112 may articulate relative to the push arm mounts via a suitable motion system 114, such as a hydraulic or pneumatic cylinder system. Rearward of the cab 106 is illustrated a work apparatus 102. As should be appreciated, the work apparatus 102 may include any of a variety of work tools such as backhoes, plows, grader blades, mowing equipment, and the like. Such work tools are well known to those skilled in the art.

At a forward end of the push arms 112, a work tool 118 is provided. According to examples, the work tool 118 is illustrative of a number of different work tools that may be attached to the work machine 100. For example, the work tool 118, illustrated in FIG. 1, is a bucket with which material may be pushed, scooped, lifted, dumped, and the like. Other types of work tools 118 may include blades for pushing material, forks for lifting material such as pallets, and the like. Different types of work tools 118 that may be utilized with the work machine 100 are well known to those skilled in the art. As should be appreciated, the configuration of components of the work machine 100, illustrated in FIG. 1, is for purposes of illustration and example only. That is, according to other types and sizes of work machines 100, the engine compartment may be forward of the cab, and work tools may be attached to a rear push arm or lifting arm.

Referring still to FIG. 1, the work machine 100 includes a track system 120 for moving the work machine 100 in a forward or backward direction. According to examples, the work machine 100 may be turned by rotating the track system 120 on one side of the work machine 100 in a forward direction while simultaneously rotating a corresponding track system (not shown) on an opposite side of the work machine 100 in a backward direction.

As illustrated in FIG. 1, the track system 120 includes a track 122 that rotates around a number of track system components in a continuous or infinite movement configuration where the track once secured into position may rotate in a forward or backward direction without interruption other than when the track is stopped or when the direction of movement is changed. According to examples, a track 122 may be manufactured according to a variety of materials and configurations. For one example, the track 122 may be comprised of a plurality of steel segments connected to each other like links of a chain such that each segment may articulate relative to adjacent segments as the track rotates about the track system 120. For another example, the track 122 may include a hardened or semi-hardened material such as rubber with rigid (e.g., steel or aluminum) internal support structures. Such a track 122 may be segmented or may be formed as a continuous belt-like structure. According to still other examples, the track 122 may be formed as a segmented or continuous belt-like structure formed from a softer material without internal structural materials. Selection of a given track type may depend on the size and weight of the work machine 100 and on the terrain or other conditions with which the work machine 100 may be used.

Referring still to the track system 120, a sprocket 126 is mounted on a distal end of the drive shaft 128. The drive shaft 128 is operatively connected to a transmission (not shown) and engine or motor (not shown) such that application of power to the drive shaft 128 from the engine or motor via the transmission causes the drive shaft 128 and the sprocket 126 to rotate. According to examples, the sprocket 126 includes a plurality of teeth 127 that engage corresponding teeth receivers (not shown) disposed along an underside of the track 122.

According to examples, rotation of the drive shaft 128 and sprocket 126 in a counterclockwise direction causes the track 122 to rotate in a counterclockwise direction that correspondingly causes the track 122 to move in a forward direction relative to the work machine 100 which, in turn, causes the work machine 100 to move forward. As should be appreciated, moving the track 122 in a forward direction while simultaneously moving a track on the opposite side of the work machine 100 in a backward direction causes the work machine to turn to the right. Moving the track 122 in a backward direction while moving a track on the opposite side of the work machine 100 in a forward direction causes the work machine 100 to move to the right.

Referring still to FIG. 1, idler wheels 124-1 and 124-2 (forward and rear, respectively) and bottom rollers 130 provide support for the track 122 along the bottom of the track system 120 as the track system 120 traverses the terrain over which the work machine 100 travels. A top roller 132 provides support for the track 122 between the sprocket 126 and the forward idler wheel 124-1.

Referring still to FIG. 1, a track adjuster and recoil system 136 is provided for adjusting tension in the track 122 and for providing springing recoil against movement of the forward idler wheel 124-1. According to examples, adjustment of the track adjuster and recoil system 136 in a forward direction pushes the forward idler wheel 124-1 forward and tightens the tension of the track 122. Likewise, adjustment of the track adjuster and recoil system 136 in a backward direction, retracts the forward idler wheel 124-1 in a backward direction and loosens the tension of the track 122. In addition, the spring 137 of the track adjuster and recoil system 136 provides for recoil of the forward idler wheel 124-1 in a backward direction to allow the forward idler wheel 124-1 to move backward under pressure to prevent damage of the components of the track system 120. Likewise, the spring 137 may urge the forward idler wheel 124-1 back in a forward direction after an instance of backward movement.

According to examples, the track adjuster and recoil system 136 may be operated manually or automatically. According to manual operation, an operator or maintenance person of the work machine 100 may manually adjust the track adjuster and recoil system 136 forward or backward to tighten or loosen the tension of the track 122. According to an automatic operation, the track adjuster and recoil system 136 may be equipped with a hydraulic or pneumatic pump and cylinder system (not shown) for automatically adjusting tension in the track 122. According to this example, a control function, for example the electronic control module described below, may be available for activating the track adjuster and recoil system for changing the tension in the track 122. According to one example, and as described below with reference to FIG. 2, the ECM 146 may automatically adjust tension in the track 122 to a desired level when the tension is determined to be too tight or too loose.

As should be appreciated, the components of the track system 120, illustrated and described with reference to FIG. 1, are for purposes of example only and are not limiting of a number of different components and configurations that may be utilized according to examples of the present disclosure. That is, other configurations may include additional drive shaft and sprocket configurations, different configurations of idler wheels, different configurations of track adjuster and recoil systems, and the like.

Referring to the upper portion of the track 122 positioned between the sprocket 126 and the forward idler wheel 24-1, track sag 134 is illustrated. According to examples, any horizontally disposed portion of the track 122 will naturally sag downward owing to the distance between the sprocket 126 and the top roller 132 and/or the forward idler wheel 124-1 and owing to the effects of gravity urging the track 122 downward. As illustrated in FIG. 1, an amount of sag 134 is illustrated between the sprocket 126 and the top roller 132 and again between the top roller 132 and the forward idler wheel 124-1.

As understood by those skilled in the art, when the work machine 100 is moved in a forward direction, rotation of the sprocket 126 toward the forward idler wheel 124-1 causes a tightening of the tension of the track 122 between the sprocket 126 and the rear idler wheel 124-2. As the track tension tightens between the sprocket 126 and the rear idler wheel 124-2, the portion of the track 122 between the sprocket 126 and the top roller 132 and/or forward idler wheel 124-1 loosens (i.e., decreases tension) and consequently increases the sag 134. When the track 122 is reversed, the portion of track between the sprocket 126 and the top roller 132 and/or forward idler wheel 124-1 will tighten and reduce the sag 134. Simultaneously, tension of the portion of the track 122 between sprocket 126 and the rear idler wheel 124-2 will loosen, and sag will be created in that portion.

As briefly described above, the appropriate tension of the track 122 is important for the for the operation of the track system 120 and for reduction of wear and tear of components of the track system 120. For example, if the track 122 is too loose, the track 122 may come off the track system 120 during operation. If the track 122 is too tight, forces on the components of the track system 120 may cause damage. For example, forces on the sprocket 126 and drive shaft 128 may bend, break, or otherwise damage the sprocket teeth 127. Such forces may also apply stress to the drive shaft 128 causing damage to the drive shaft 128 or to the internal transmission system or engine/motor components. That is, as should be appreciated, if tension in the track 122 is too loose or too tight, any component in contact with the track 122 may be damaged or excessively worn.

Referring still to FIG. 1, a control system 140 is illustrated in the engine compartment 104 of the work machine 100. According to examples, the control system 140 may include, among other things, an inertial measurement unit (IMU) 142, a transmission output (TOS) unit 144, and an electronic control module (ECM) 146. According to examples, the IMU 142 is operative to detect and report vertical and horizontal acceleration and deceleration of the work machine 100. For example, if the work machine 100 is accelerated forward or backward, the IMU 142 will detect and may report the horizontal acceleration or deceleration as the work machine is in a speeding up or slowing down condition. As understood by those skilled in the art, if the work machine is moving at a constant speed, the IMU 142 may detect zero or near zero horizontal acceleration or deceleration. On the other hand, if the work machine is moving up or down a slope, an amount of vertical acceleration or deceleration in addition to the downward acceleration due to gravity may be detected.

According to examples, the transmission output speed (TOS) unit 144 is operative to detect and report operation of the transmission and drive system of the work machine 100, including transmission output speed. According to examples of the present disclosure, the TOS unit 144 may detect and report the speed of the drive shaft 128 and sprocket 126, and in so doing, may detect speed changes in the work machine 100. Knowing the speed of rotation of the drive shaft 128 and sprocket 126 allows for detection and reporting of the speed of movement of the track 122 in either a forward or backward direction. In addition to detecting speed of the drive shaft 128 and sprocket 126, the TOS unit 144 also may detect speed of the track 122 by counting teeth 127 as the sprocket 126 rotates. That is, by knowing the diameter, circumference, and tooth count of the sprocket 126, the speed of the track 122 may be determined based on rotation of the sprocket 126.

According to examples, the ECM 146 may include an onboard computer that controls electrical systems of the work machine 100 and that monitors, analyzes and diagnoses problems associated with the work machine 100 performance. The ECM 146 may monitor any component of the work machine for which sensors are deployed including but not limited to the IMU 142 and the TOS unit 144. For example, the ECM 146 may monitor component performance and status including, but not limited to work machine speed, acceleration, deceleration, loading/unloading/pushing forces, fuel consumption, ignition timing, battery charge levels, tire pressure, hydraulic and pneumatic systems fluid levels and pressures, breaking force data, and the like. The ECM 146 may also monitor physical features such as thickness of brake pads, ages of components, repair, and maintenance histories, etc.

According to examples of the present disclosure, the ECM 146 may receive acceleration and deceleration data from the IMU 142 and transmission speed from the TOS unit 144 for determining tension in the track 122 described herein. According to examples of the present disclosure, tension of the track 122 may be determined as a function of a time delay between a speed change of the work machine 100 and an indication of acceleration or deceleration of the work machine 100. That is, if the TOS unit 144 detects a speeding up or slowing down of the work machine without a corresponding acceleration or deceleration detected by the IMU 142, the time delay between the speed change detected by the TOS unit 144 and the acceleration or deceleration detected by the IMU 142 may be considered as the time in which track sag 134 is taken up by movement of the sprocket 126. On the other hand, very little or no time delay experienced between a speed change detected by the TOS unit 144 and acceleration or deceleration detected by the IMU 142 may indicate that the tension in the track 122 is too tight because very little sag 134 is present in the track 122 to be taken up by the sprocket 126.

According to examples, the determination of track tension in terms of work machine speed and acceleration/deceleration may be performed by the ECM 146 which may, in turn, report a need for adjusting the tension in the track 122 to maintenance personnel or to an operator of the work machine 100 for manual tension adjustment. Alternatively, the ECM 146 may cause automatic adjustment of the tension of the track 122 and, as described above.

Figure 2:
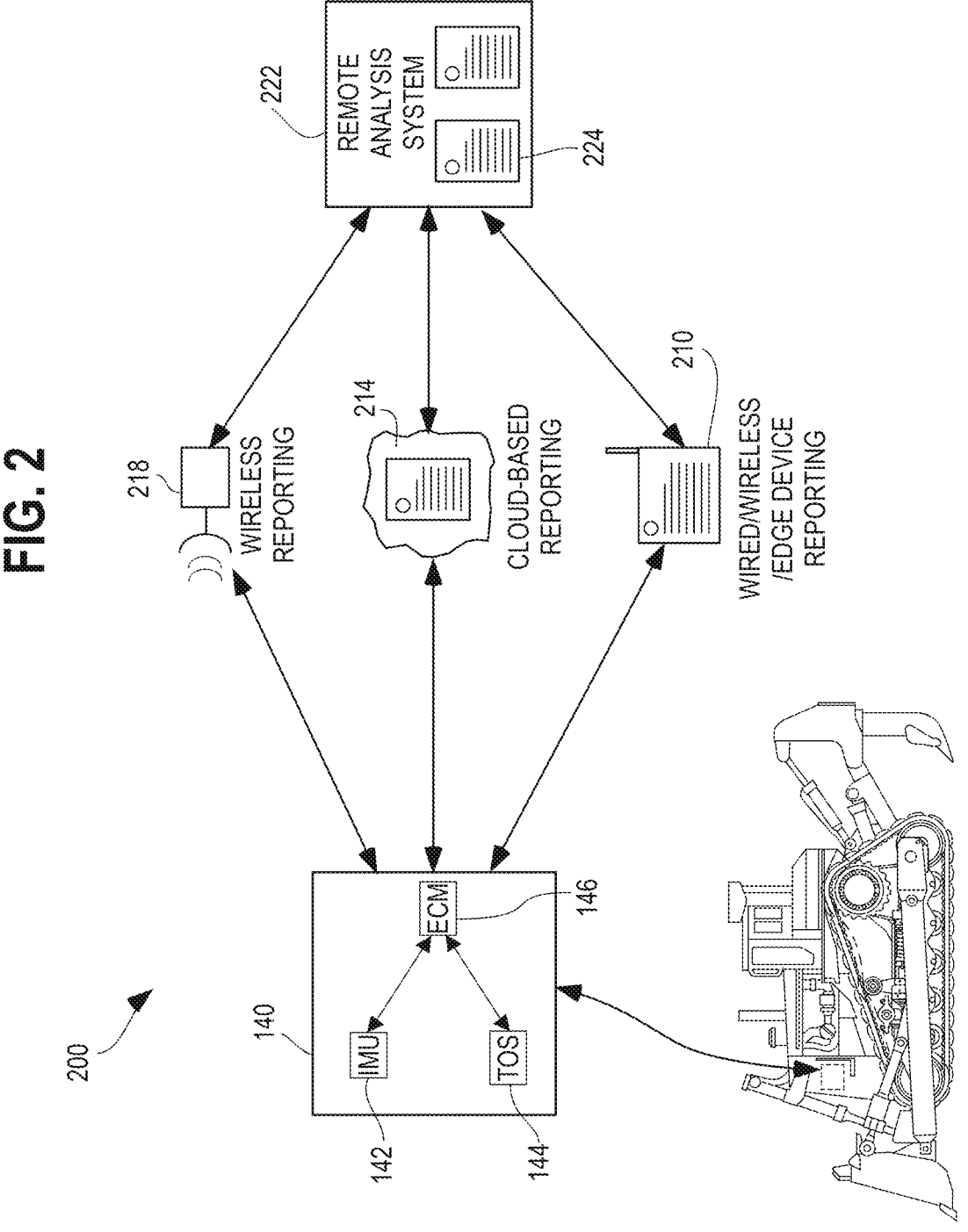
FIG. 2 illustrates a system for monitoring track tension of a track-enabled work machine, according to examples of the present disclosure.

FIG. 2 illustrates a system for monitoring track tension of a track-enabled work machine, according to examples of the present disclosure. As illustrated in FIG. 2, the data and determinations from TOS unit 144, the IMU 142 and the ECM 146 may be transmitted to a remote analysis system 222 for reporting operation data for the work machine 100 including information on the tension of the track 122. According to one example, data from the control system 140 may be transmitted wirelessly via a wireless reporting system 218 such as a satellite system, wireless access point, or via cellular transmission from the work machine 100 to the remote analysis system 222. According to another example, data from the work machine 100 may be transmitted to the remote analysis system 222 via a cloud-based reporting system 214. According to this example, the determination of tension in the track 122 may be performed at the cloud-based analysis system before being passed to the remote analysis system 222. According to another example, data from the control system 140 may be passed to an edge device 210 that may be functionally associated with the work machine 100 via wired or wireless connection. As understood by those skilled in the art, edge devices 210 may include computing devices that operate between physical environments (e.g., the work machine 100) and one or more digital processes. Edge devices 210 may be used for monitoring systems such as machinery (in this case, the work machine 100) and for routing information between networks. According to examples, a determination of tension in the track 122 may be performed at the edge device 210, and tension information may then be passed to the remote analysis system 222.

According to examples, the ECM 146 may receive data from the TOS unit 144 and IMU 142, but the determination of track tension may be determined at a remote analysis system 222. According to examples, the remote analysis system 222 may be operated by manufacturer, dealer, or maintenance operation for the work machine 100. Alternatively, the track tension determination may be performed at the ECM 146 and may be reported to the remote analysis system 222. Personnel at the remote analysis system 222 may then analyze the data for determining maintenance needs for the work machine 100, for determining repair or parts needs for the work machine 100, or for fleet management determinations.

As should be appreciated, personnel from the remote analysis system 222 may record and perform further analysis of the operation of the work machine 100 via computing systems 224. In response to analysis at the remote analysis system 222, tension adjustment of the track 122 of the work machine 100 may be directed from personnel at the remote analysis system 222 by communicating tension adjustment needs to an operator of the work machine 100 or to an on-site maintenance person. Alternatively, track tension adjustment may be directed from the remote analysis system 222 to the ECM 146 of the work machine 100 which, in turn, may direct automatic tension adjustment of the track 122, as described above.

Figure 3:
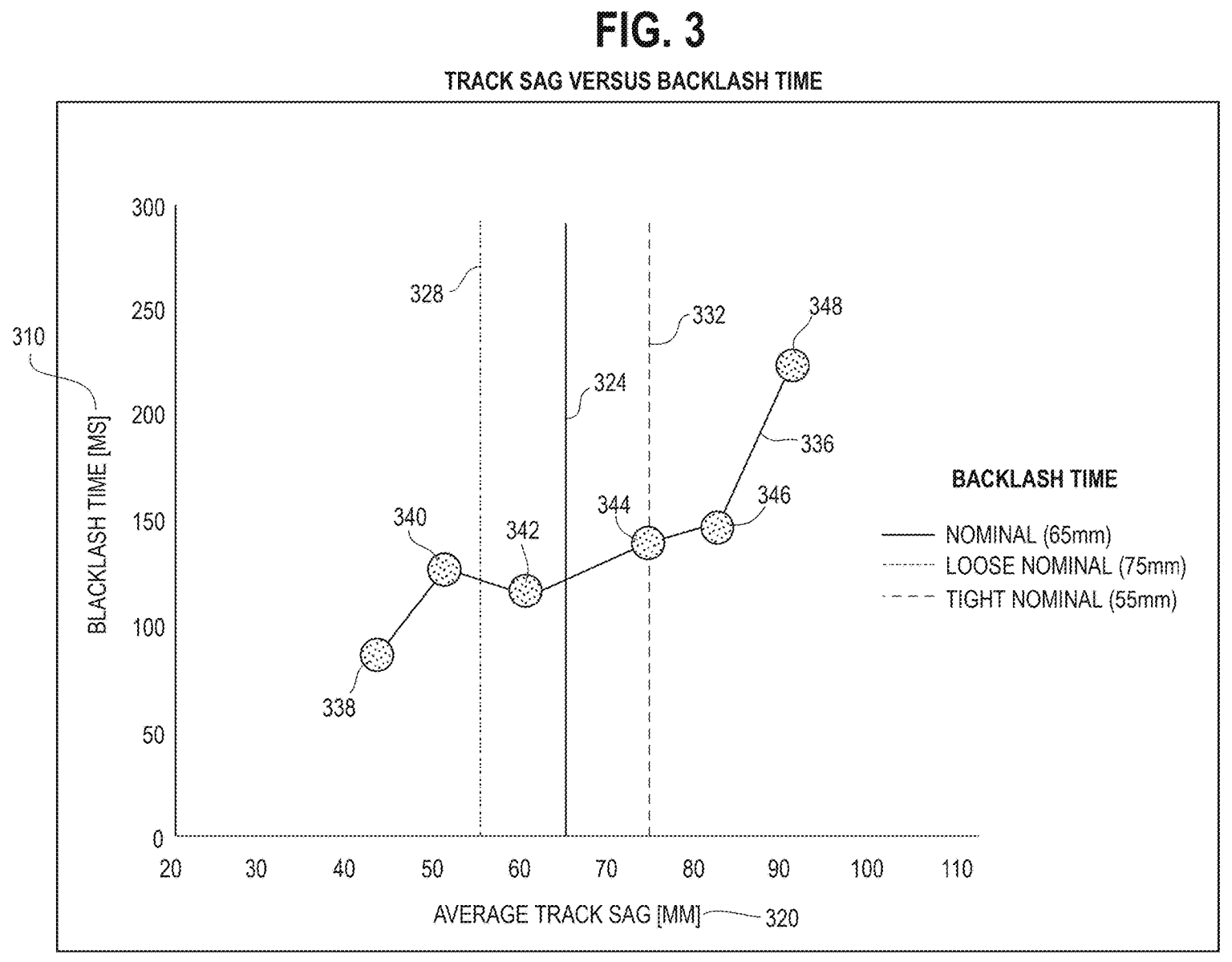

FIG. 3 illustrates a histogram graph showing track backlash time versus average track sag, according to examples of the present disclosure. As illustrated in FIG. 3, backlash time 310 is plotted against average track sag 320. According to examples, backlash may include distance of travel between a sprocket tooth and a sprocket receiver slot when the sprocket changes directions or, according to examples of the present disclosure, backlash may include the time needed to take up sag 134 of the track 122. In the case of sprocket teeth, when the work machine 100 changes from a forward to reverse movement or vice versa, the sprocket 126 changes direction of rotation. Space between sprocket teeth and sprocket teeth receiver slots in the track 122 is closed when the sprocket changes directions. Time for the sprocket teeth to engage the interior of the sprocket teeth receiver slots is referred to as the backlash time. According to examples of the present disclosure, a change in direction of the sprocket 126 in response to a change from forward to backward or vice versa causes a take-up of slack or sag 134 of the track 122. The time required for the take-up of the slack or sag 134 is the backlash time.

Referring still to FIG. 3, the data plotted in the graph 300 is illustrative of backlash time 310 versus average track sag 320 for an example work machine 100. In the example graph 300, a small number of data points are illustrated for purposes of example only and for purposes of showing one example set of test data. That is, the variability of backlash time versus average track sag illustrated in FIG. 3 is illustrated for the small number of example data points. As should be appreciated, in operation of examples described herein, hundreds, thousands or more data points may be plotted over the course of operation of the work machine 100. In addition, the data for a different work machine 100 having a different track system 120 configuration may be different from the data illustrated in FIG. 3.

As illustrated in FIG. 3, a normal or nominal average track sag is illustrated as line 324. According to the example test data illustrated in FIG. 3, the nominal average sag 134 is 65 millimeters (mm). That is, a nominal average sag for the example work machine 100 is 65 mm below a horizontal line illustrated for track 122 between the sprocket 126 and the top roller 132 or between the top roller 132 and the forward idler wheel 124-1. An average sag of 55 mm is illustrated as line 328. According to this example, the average sag of 55 mm illustrates a lower sag threshold below which the track 122 will be considered too tight. Referring still to FIG. 3, an average track sag of 75 mm is represented as line 332. The average track sag of 75 mm illustrates an upper sag threshold above which the track 122 will be considered too loose. Thus, according to the example illustrated in FIG. 3, a track sag average between 55 mm and 75 mm is considered acceptable track sag 134 for the example work machine 100. As should be appreciated, the average track sag thresholds for too tight, normal and to let loose track tensions is determined through testing for different work machines 100 and may be different for different work machine types and track system configurations.

Referring still to FIG. 3, the plot line 336 represents plotted backlash times at corresponding average track sags. For example, points 338 and 340 represent backlash times corresponding to average track sags below the "too tight" nominal line at 55 mm. Points 346 and 348 represent backlash times corresponding to average track sags above the "too loose" nominal line at 75 mm. Points 342 and 344 represent backlash times corresponding to acceptable average track sags. As described herein, each plotted point represents the time delay for backlash (sag take-up) measured between work machine 100 speed up or slow down as detected by the TOS unit 144 and an indication of machine 100 acceleration or deceleration as detected by the IMU 142. Thus, if a backlash time occurs quickly, for example after 75 milliseconds (ms), at which the average track sag is 40 mm, the resulting plotted point 338 shows that the track sag for the example work machine 100 is too tight and that the tension of the track 122 should be reduced. Similarly, at point 348, a backlash time of 225 ms corresponds to an average track sag of 90 mm which indicates the track 122 is too loose and that the tension of the track 122 should be increased.

According to examples, by testing the work machine 100 at various backlash times at which corresponding average track sags are determined, a graph 300, as illustrated in FIG. 3, may be generated for each work machine 100. Based on such testing, when a backlash time is determined as the difference between the time of the start of a speed up or slow down of the work machine 100 and the time at which acceleration or deceleration is detected, the resulting average track sag may be determined, and track tension may be adjusted as needed.

Figure 4:
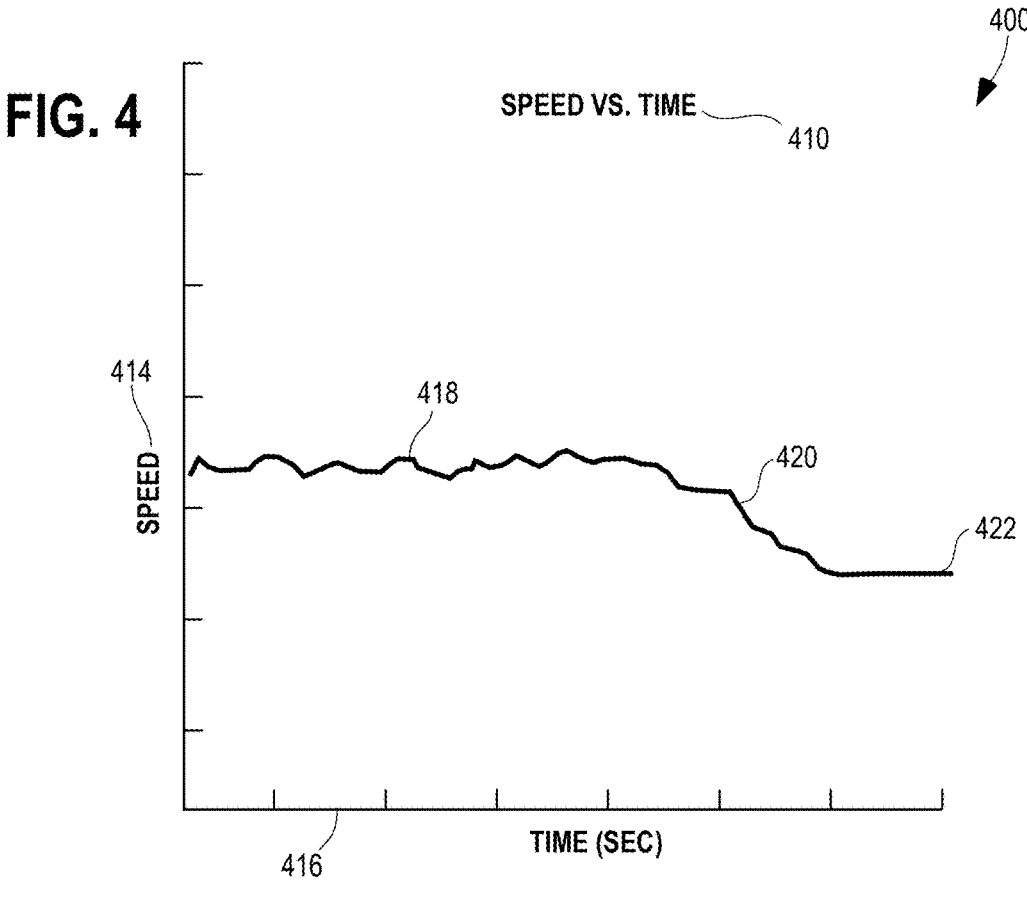
FIG. 4 illustrates a pair of graphs showing a relationship of work machine transmission output speed with work machine acceleration, according to examples of the present disclosure.
Figure 4:
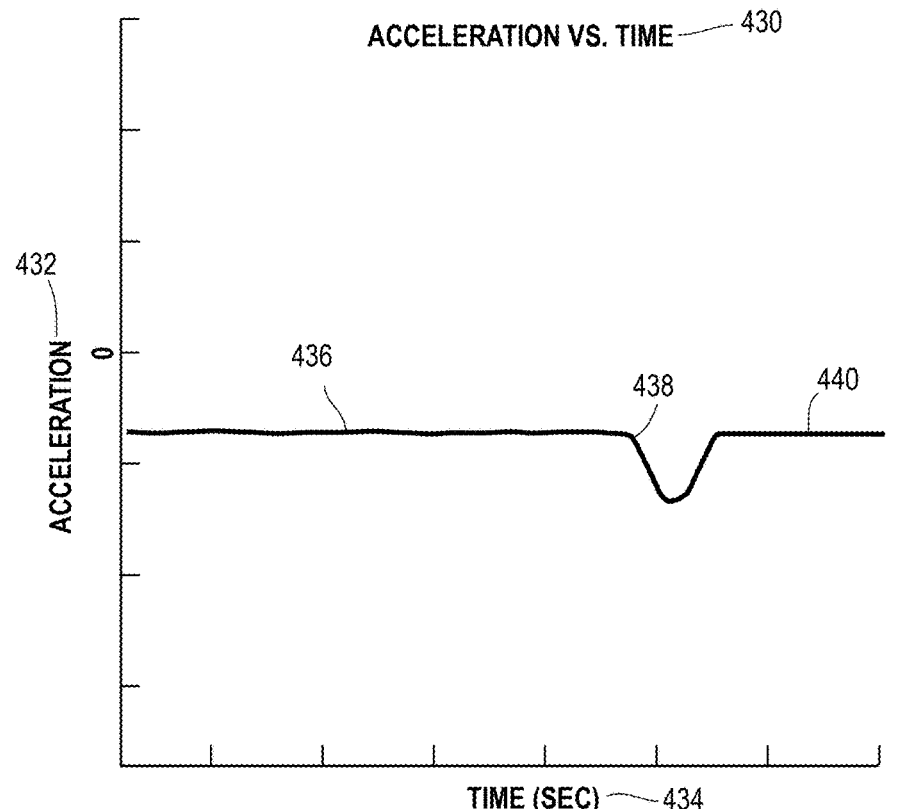

FIG. 4 illustrates a pair of graphs showing a relationship of work machine transmission output speed with work machine acceleration, according to examples of the present disclosure. As illustrated in the upper graph 410 of FIG. 4, work machine speed 414 versus time 416 plotted. As described herein, work machine speed is determined by transmission output speed via the TOS unit 144. As illustrated in the lower graph 430, work machine acceleration or deceleration versus time is plotted. As described herein, work machine acceleration or deceleration is detected by the IMU 142.

Considering the upper graph 410 and the lower graph 430 together, at position 418 in the upper graph 410, the speed of the example work machine 100 is relatively constant corresponding to a relatively constant acceleration illustrated in the lower graph 430 at position 436. That is, because speed of the work machine 100 is relatively constant, very little change in acceleration will be detected as the example work machine 100 is not accelerating or decelerating (negative acceleration). However, at position 420 illustrated in the upper graph 410, the speed of the work machine 100 begins to decrease to a lower speed at position 422. At position 438, illustrated in the lower graph 430, the acceleration of the work machine goes down (i.e., decelerates) and then returns back to a zero status at position 440 after acceleration (in this example, deceleration) ceases.

According to this example, the operator of the work machine may have switched the drive of the work machine 100 from a forward to reverse setting at position 420 resulting in an immediate slowing of forward movement of the work machine 100. Alternatively, at position 420, the operator may have applied braking to begin a slowing of the forward movement of the work machine 100. In either case, owing to a shift from forward to reverse or to a braking action, the work machine 100 begins to decelerate at position 438, illustrated in the lower graph 430. According to examples of the present disclosure, at the time the speed changes are detected at position 420, a timer is started by the ECM 146 and runs until acceleration or deceleration is detected at position 438. That is, prior to starting a timer, a detection of a speed change of the work machine is detected. The elapsed time delay between the start of the speed change and the indication of acceleration of deceleration may then be plotted as illustrated in FIG. 3 to determine whether the corresponding track sag 134 is acceptable for the example work machine 100.

Referring still to FIG. 4, the plotted data is for purposes of example only. That is, if the operator performs another action such as depressing an accelerator of the work machine 100, the top graph may show the speed of the work machine going up instead of going down as illustrated in graph 410 of FIG. 4. Simultaneously, a positive acceleration above the zero line may be plotted as an uptick in acceleration before returning back to the zero acceleration line after the speed of the work machine becomes steady again after the operator stops accelerating the work machine 100. According to examples, acceleration or deceleration is delayed for a period of time as track sag 134 is taken up as described herein. Once track sag is taken up, then acceleration or deceleration of the work machine is detected as illustrated at position 438 before returning back to a zero acceleration/deceleration at position 440 when the work machine is no longer accelerating or decelerating. As described herein, the delay between the commencing of a slowing down or speeding up of work machine and the detection of acceleration or deceleration may then be used to determine an amount of sag 134 present in the track 122.

According to an alternative example, as described herein, instead of measuring the time delay between commence-ment of a slowing down or speeding up of the work machine 100 and detection of acceleration or deceleration, the time delay may also be measured based on tooth count of the teeth 127 of the sprocket 126 that pass between start of the slowing down or speeding up action and actual movement of the work machine 100 for determining an amount of sag 134 present in the track 122. That is, the tooth count experienced between the start of the slowing down or speeding up action and actual movement of the work machine 100 corresponds to the take-up of the sag 134 in the track 122.

FIG. 5 illustrates a flow diagram of an example method for monitoring track tension of one or more tracks of a track-enabled work machine, according to examples of the present disclosure. The techniques and methodologies described herein are described in generic terms for the illustrated work machine 100. As should be appreciated, the techniques and methodologies described herein may be utilized for a number of different work machine types, work machine track systems, work machine masses, track types and masses, etc. That is, the data illustrated and described above with reference to FIGS. 3 and 4, and the operations described below with reference to FIG. 5 may vary accord-ing to work machine variation without departing from the scope of the present disclosure.

The method 500 begins at START operation 502 and proceeds to operation 506. At operation 506, initial condi-tions for the work machine 100 are verified. For example, for purposes of testing the track sag 134 of the work machine 100, the conditions in which the work machine 100 is operated such as terrain, surface moisture, bucket loading, and the like are considered to ensure that operating condi-tions will not affect work machine speed or acceleration/deceleration in a manner that will affect data being generated for determining whether tension in the track 122 is accept-able. For example, loose or wet surface conditions may affect a time delay between work machine speed changes and indication of acceleration or deceleration. After verify-ing operating conditions are acceptable for testing the work machine 100, the work machine 100 is started and is run at a constant speed.

At operation 510, a change in direction of the work machine 100 is initiated. For example, at operation 510 an operator of the work machine 100 may switch the work machine from forward to reverse or vice versa. At operation 514, at the point of the change in direction, a work machine speed as detected by the transmission output speed via the TOS unit 144 is received.

At operation 518, a timer is started by the ECM 146. According to one example, instead of starting a timer at operation 518, the ECM 146 may begin a tooth count of the sprocket 126 as it rotates through rotation cycles required for moving the track 122, as described herein. At operation 522, the IMU 142 detects acceleration or deceleration of the work machine 100 resulting from the direction change registered at operation 510. At operation 526, in response to determin-ing acceleration or deceleration, the ECM 146 stops the timer or sprocket tooth count.

At operation 530, the time delay between start of the speed change and detection of acceleration or deceleration is analyzed by the ECM 146 or at the remote analysis system 222, as described with reference to FIG. 3. At operation 534, the work machine speed, acceleration/deceleration and time delay between speed up or slow down and the point of acceleration or deceleration are plotted as illustrated and described above with reference to FIGS. 3 and 4.

At operation 538, the received and plotted data is ana-lyzed to determine whether the tension in the track 122 requires adjustment. At operation 542, the data analysis is reported to an operator or maintenance person for manual track tension adjustment if required. Alternatively, the data analysis is reported to the ECM 146 for automatic adjust-ment. At operation 546, the tension of track 122 is adjusted as required. According to examples, after test data for the work machine 100 is generated according to a number of different speed changes, accelerations/decelerations, plotted data, as illustrated and described above with reference to FIGS. 3 and 4, may be used to determine track sag in future operations of the work machine 100 for a variety of time delays experienced between the start of speed changes and indication of acceleration/deceleration of the work machine 100. The method 500 ends at END operation 550.

Figure 6:
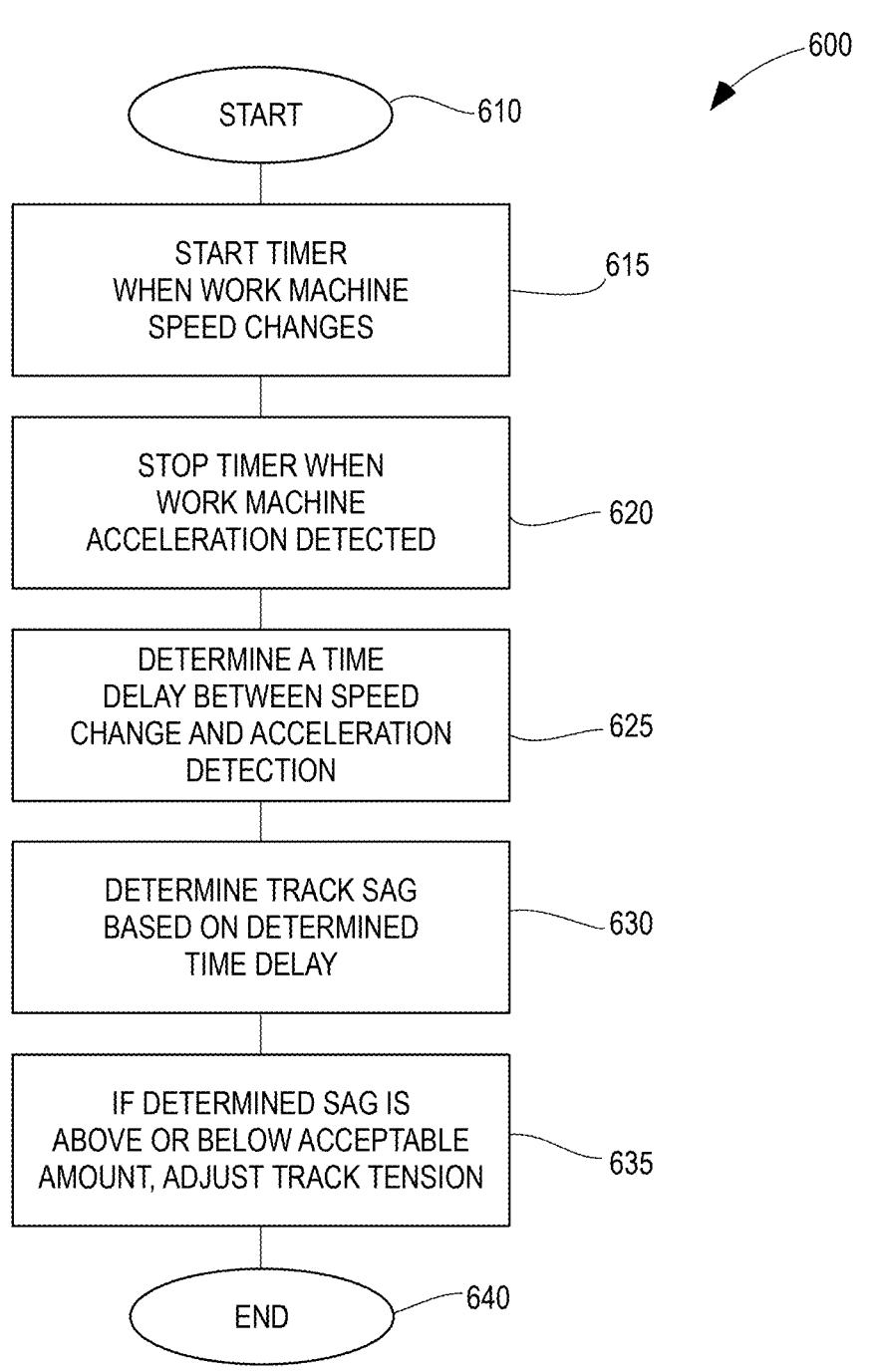
FIG. 6 illustrates a flow diagram of an example method for monitoring track tension of one or more tracks of a track-enabled work machine, according to examples of the present disclosure.

FIG. 6 illustrates a flow diagram of an example method for monitoring track tension of one or more tracks of a track-enabled work machine, according to examples of the present disclosure. The method 600 begins at START opera-tion 610 and proceeds to operation 615. At operation 615 a timer is started by the ECM 146 when an indication of a speed change of the work machine 100 is detected. As described herein, an indication of a speed change may be detected by the TOS unit 144 based on transmission speed transmitted to the sprocket 126.

At operation 620, the timer is stopped by the ECM 146 when an indication of an acceleration of the work machine is detected by the IMU 142. That is, prior to stopping the timer, the ECM receives an indication of an acceleration or deceleration of the work machine 100. At operation 625, a time delay between the indication of the speed change of the work machine and the indication of the acceleration of the work machine is determined by the ECM 146. At operation 630, an amount of sag in a work machine track is determined based at least in part on the determined time delay. That is, the determined time delay may be used for determining track sag by comparing the time delay with previous test results for the work machine 100 as described above with reference to FIG. 5.

At operation 635, if the determined amount of sag in the work machine track 122 is above or below an acceptable amount of sag, as illustrated above with reference to FIG. 3, an indication that tension of the work machine track 122 requires adjustment may be provided to an operator of the work machine 100, a maintenance person of the work machine 100, or to personnel associated with the remote analysis system 222. Alternatively, the indication that ten-sion of the track 122 requires adjustment may be passed directly to the ECM 146 for automatic tension adjustment of the track 122. The method 600 ends at END operation 640.

Figure 7:
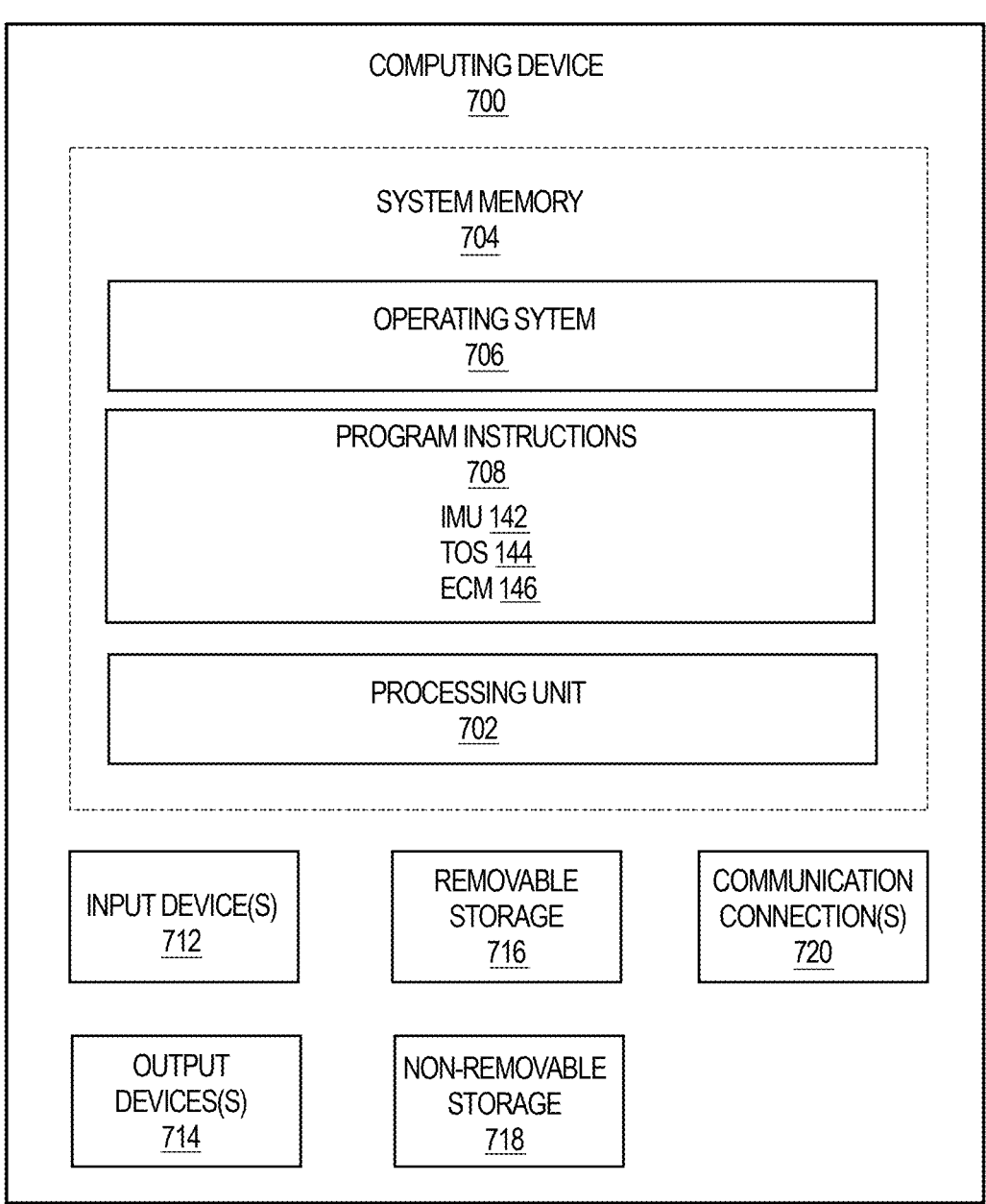
FIG. 7 illustrates a computer architecture diagram showing illustrative hardware architecture for implementing aspects of various technologies of the present disclosure.

FIG. 7 is a block diagram illustrating physical compo-nents of an example computing device with which examples of the present disclosure may be practiced. The computing system 700 may include at least one processing unit 702 and the system memory 704. The system memory 704 may comprise, but is not limited to, volatile (e.g., random access memory (RAM)), non-volatile (e.g., read only memory (ROM)), flash memory, or any combination thereof. System memory 704 may include an operating system 706, one or more program instructions 708, and may include sufficient computer-executable instructions for operating the IMU 142, TOS unit 144 and ECM 146, described herein. Oper-ating system 706, for example, may be suitable for controlling the operation of the computing system 700. Furthermore, examples may be practiced in conjunction with a graphics library, other operating systems, or other application programs and is not limited to any application or system. This basic configuration is illustrated by those components within a dashed line 710. The computing system 700 may also include one or more input device(s) 712 (e.g., keyboard, mouse, pen, touch input device, etc.) and one or more output device(s) 714 (e.g., display, speakers, printers, etc.).

The computing system 700 may also include additional data storage devices (removable or non-removable) such as, for example, magnetic discs, optical discs, or tape. Such additional storage is illustrated by removable storage 716 and a nonremovable storage 718. The computing system 700 may also contain a communication connection 720 that may allow the computing system 700 to communicate with other computing devices such as over a network in a distributed computing environment, for example, an intranet or the Internet. The communication connection 720 is an example of a communication medium, via which computer-readable transmission media (i.e., signals) may be propagated.

Program modules may include routines, programs, components, data structures, and other structures that may perform tasks or that may implement abstract data types. Moreover, examples may be practiced with other computer system configurations, including hand-held devices, multiprocessor systems, microprocessor-based or programmable user electronics, minicomputers, mainframe computers, and the like. Examples may also be practiced in distributed computing environments where tasks are performed by remote computing and processing devices that are linked through a communications network. In a distributed computing environment, programming modules may be in both local and remote memory storage devices. Furthermore, examples may be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SOC)). Examples may also be practiced using other technologies capable of performing logical operations such as, for example, AND, OR, and NOT, including but not limited to mechanical, optical, fluidic, and quantum technologies. In addition, examples may be practiced within a general-purpose computer or in other circuits or systems.

Examples may be implemented as a computer process (method), a computing system, or as an article of manufacture, such as a computer program product or computer-readable storage medium. The computer program product may be a computer storage medium readable by a computer system and encoding a computer program with instructions for executing a computer process. Accordingly, hardware or software (including firmware, resident software, microcode, etc.) may provide examples discussed herein. Examples may take the form of a computer program product on a computer-usable or computer-readable storage medium having computer-usable or computer-readable program code embodied in the medium for use by, or in connection with, an instruction execution system.

Examples of the present disclosure may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented within the computing system 700 or any other computing devices, in combination with the computing system 700, where functionality may be brought together over a network in a distributed computing environment, for example, an intranet or the Internet to perform the functions described herein. Systems, devices, and processors described herein are provided as examples; however, other systems, devices, and processors may comprise the memory storage and processing unit, consistent with the described disclosure.

INDUSTRIAL APPLICABILITY

During normal movement of a track type work machine, the slack or sag in a work machine track lays in front of the drive sprocket. During a directional change (forward to reverse or vice versa), the track slack or sag must pass from the front of the sprocket to the rear of the sprocket. Due to the inertia of the work machine, there exists a short period of time between when the work machine controls begin slowing the transmission output and when the machine physically responds where the track slack or sag is being taken up and is moved from the front of the sprocket to the rear of the sprocket.

Methods and systems are provided for monitoring track tension of track-enabled work machines using work machine acceleration and transmission speed sensors. According to examples, a speed change of a transmission output system of a track-enabled work machine is detected by a transmission output unit. For example, a speed change may occur when the machine changes directions (e.g., forward to backward or vice versa) or when the machine is accelerated or decelerated (e.g., throttling or braking). When the speed change is detected, a timer is started. When subsequent acceleration or deceleration of the work machine is detected by an inertial measurement unit, the timer is stopped. The elapsed time between the start of the speed change and the start of acceleration or deceleration is detected and is used to determine the amount of time necessary for taking up slack or sag in the work machine track.

If the time required for taking up the slack or sag is excessive, an indication may be received that the track is too loose. If the time required for taking up the slack or sag is minimal, an indication may be received that the track is too tight. In either case, the determination of the time required for taking up the slack or sag may indicate that tension in the track requires adjustment.

According to examples, testing may be conducted on a number of different work machines, and the times required for taking up slack or sag in work machine tracks may be analyzed and plotted. Subsequent, determinations of time delays between detection of a work machine speed change and a work machine acceleration or deceleration may be readily compared with testing data to quickly determine whether a work machine track tension requires adjustment. Determining track tension according to examples of the present disclosure is particularly advantageous because the methods and systems described herein may be employed for track-enabled work machines of any type or size by use of track speed and acceleration/deceleration sensors and analysis.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

The invention claimed is:

1. A method, comprising:
starting a timer when an indication of a speed change of a work machine is detected;
stopping the timer when an indication of an acceleration of the work machine is detected;
determining a time delay between the indication of the speed change of the work machine and the indication of the acceleration of the work machine;
determining an amount of sag in a work machine track based at least in part on the determined time delay; and
if the determined amount of sag in the work machine track is above or below an acceptable amount of sag, providing an indication that a tension of the work machine track requires adjustment.

2. The method of claim 1, further comprising receiving an adjustment of the tension of the work machine track.

3. The method of claim 1, wherein determining a time delay between the indication of the speed change of the work machine is detected and the indication of the acceleration of the work machine is detected includes determining a time for a take-up of the sag in the work machine track.

4. The method of claim 2, wherein receiving an adjustment of the tension of the work machine track includes receiving an automatic adjustment of the tension of the work machine track.

5. The method of claim 4, wherein receiving an automatic adjustment of the tension of the work machine track includes receiving an automatic adjustment of the tension of the work machine track from a work machine electronic control module.

6. The method of claim 1, wherein prior to starting a timer when an indication of a speed change of a work machine is detected, further comprising receiving a detection of a speed change of the work machine.

7. The method of claim 6, wherein receiving a detection of a speed change of the work machine includes receiving a detection of a speed change based on a change of a transmission output associated with movement of the work machine track.

8. The method of claim 7, wherein receiving a detection of a speed change based on a change of a transmission output associated with movement of the work machine track includes receiving a detection of a speed change based on a transmission output associated with rotation of a sprocket, the sprocket operative to move the work machine track.

9. The method of claim 6, wherein receiving a detection of a speed change of the work machine includes receiving a detection of a direction change of the work machine.

10. The method of claim 1, wherein prior to stopping the timer when an indication of an acceleration of the work machine is detected, further comprising receiving an indication of an acceleration of the work machine.

11. The method of claim 10, wherein receiving an indication of an acceleration of the work machine includes receiving an indication of a deceleration of the work machine.

12. The method of claim 10, wherein receiving an indication of an acceleration of the work machine includes receiving an indication of a horizontal inertial measurement change for the work machine.

13. The method of claim 12, wherein receiving an indication of a horizontal inertial measurement change for the work machine includes receiving the indication of a horizontal inertial measurement change for the work machine based on an inertial measurement unit output.

14. A system for monitoring tension in a work machine track, comprising:
a transmission output unit operative to indicate a speed change of the work machine;
an inertial measurement unit operative to indicate an acceleration of the work machine; and
an electronic control module operative:
to start a timer when an indication of a speed change of a work machine is detected;
to stop the timer when an indication of an acceleration of the work machine is detected;
to determine a time delay between the indication of the speed change of the work machine and the indication of the acceleration of the work machine; and
to determine an amount of sag in a work machine track based at least in part on the determined time delay.

15. The system of claim 14, wherein the electronic control module is further operative to provide an indication that a tension of the work machine track requires adjustment if the determined amount of sag in the work machine track is above or below an acceptable amount of sag.

16. The system of claim 14, wherein the electronic control module is further operative to determine a time for a take-up of the sag in the work machine track based on the time delay between the indication of the speed change of the work machine and the indication of the acceleration of the work machine.

17. The system of claim 14, wherein the electronic control module is further operative:
to receive an indication of a speed change of the work machine from the transmission output unit prior to starting the timer; and
to receive an indication of an acceleration of the work machine from the inertial measurement unit prior to stopping the timer.

18. The system of claim 14, wherein the electronic control module is further operative to determine a time for a take-up of the sag in the work machine track based on the time delay between the indication of the speed change of the work machine and the indication of the acceleration of the work machine.

19. A method of monitoring tension in a work machine track, comprising:
starting a timer at an electronic control module when an indication of a speed change of the work machine is detected from a transmission output unit;
stopping the timer at the electronic control module when an indication of an acceleration of the work machine is detected by an inertial measurement unit;
determining at the electronic control module a time delay between the indication of the speed change of the work machine and the indication of the acceleration of the work machine;
determining at the electronic control module an amount of sag in the work machine track based at least in part on a time for a take-up of the sag in the work machine track based on the time delay between the indication of the speed change of the work machine and the indication of the acceleration of the work machine; and
if the determined amount of sag in the work machine track is above or below an acceptable amount of sag, adjusting a tension of the work machine track by the electronic control module.

20. The method of claim 19, wherein starting a timer at an electronic control module when an indication of a speed change of the work machine is detected from a transmission output unit includes starting the timer when an indication of a direction change of the work machine is detected; and stopping the timer at the electronic control module when an indication of an acceleration of the work machine is detected by an inertial measurement unit includes stopping the timer at the electronic control module when an indication of a horizontal inertial measurement change for the work machine is detected.

* * * * *